3,194,671
SELF-SETTING CEMENTS AND METHODS OF MAKING THE SAME
Paul J. Yavorsky, Bedford, and John F. Svet, Cleveland, Ohio, assignors to Zirconium Corporation of America, Solon, Ohio, a corporation of Ohio
No Drawing. Filed June 28, 1962, Ser. No. 205,880
18 Claims. (Cl. 106—55)

The present invention is directed to self-setting cement, mortar and concrete materials and the like that can be set without the use of external heat, and, more particularly, to self-setting refractory cements that are hard, strong and heat resistant, and to methods of making the same.

It is an object of the present invention to provide a method of making a self-setting refractory cement composition that can be set without the use of external heat or evaporation.

It is an object of the present invention to provide a method of making a refractory composition and the improved composition made thereby for use as a self-setting cement and the like, the method comprising mixing powdered and granular refractory particles with a low temperature binder that subsequently converts to a refractory material that is also a high temperature binder and a gelling agent for said binder by which gelling action the composition is set without the need of external heat.

It is an object of the present invention to provide a method of making a self-setting cement and the novel cement composition made thereby, the method comprising mixing finely divided refractory materials such as zirconia, a binder for said zirconia such as zirconium acetate, and a gelling agent for the zirconium acetate such as powdered magnesium oxide to provide a cement composition that can be set without the use of external heat.

Other objects will be apparent from the specification that follows and the appended claims.

The present invention comprises a method of making a self-setting, heat resistant cement which can be set without the use of external heat, the method including mixing (1) about 100 parts by weight of granular particles of a refractory material such as zirconia (2) ¼ to 50 parts by weight of an organic acid such as zirconium acetate that functions as a low temperature binder for said zirconia particles and subsequently during processing converts to a refractory material such as $ZrO_2$ and thus is present in the final fired composition as $ZrO_2$, and (3) a gelling agent such as powdered MgO that gels said zirconium acetate without the need for external heat, and thereafter reacting the binder and gelling agent merely by allowing the intimately mixed green composition to stand in a mold at room temperature to set the same to form a strong, hard, heat resistant refractory article.

The present invention also provides a novel cement composition that can be converted without the use of heat into a hard, strong refractory article. The term "without the use of heat" is meant without the use of a source of heat applied directly to the mold and exceeding the sensible heat in the atmosphere. One preferred formulation of the above mentioned self-settable composition is (1) 100 parts by weight of a mixture of refractory particles of zirconia or zirconium silicate having a grain size of from less than about ½ micron to about 2 mesh, (2) about ¼ to 50 parts by weight of zirconium acetate and (3) about 0.01 to 5 parts by weight of powdered magnesium oxide.

These self-setting compositions can be hardened in a manner similar to plaster of Paris. The compositions can be formed in a mold and the mold subsequently removed or the compositions, if desired, can be troweled and formed to an eventual hard, heat resistant material without the use of a mold.

The following groups of gelling agents have been found to be suitable for use in preparing the outstanding self-setting refractory compositions of the present invention:

(1) Salts or other compounds that gelate the zirconium or hafnium acetate (formate, lactate, etc.) and form stabilizing oxides of zirconia or hafnia when adequately reacted.

(A) The alkaline earth oxides as CaO, MgO, BaO, SrO and including the alkali $Li_2O$ (which occasionally behaves as an alkaline earth oxide).

(B) The rare earth oxides as $CeO_2$, $La_2O_3$, $Sc_2O_3$, $Dy_2O_3$, and $Y_2O_3$.

(2) Salts that gelate the zirconium or halfnium acetate that form fugitive reactant products as: $MoO_3$, $Na_2O$, $ZnO$, $WO_3$, $Na_2B_4O_7$, $KIO_3$, $P_2O_5$.

(3) Those salts that gelate the zirconium or hafnium acetate (formate, etc.) which form neither stabilizing oxide nor fugitive products but of such low concentration as not to be generally deleterious.

Sodium salts ($Na_2SiO_3$, $Na_2ZrO_3$, $Na_4P_2O_7$, etc.), lithium salts ($Li_2SiO_3$, $Li_2ZrO_3$, $Li_2ZrSiO_5$, etc.), potassium salts ($K_2SiO_3$, $K_2ZrO_3$, $K_4P_2O_7$, etc.), magnesium salts ($MgO \cdot 3\ SiO_2$, $MgO \cdot Al_2O_3$). Organics and metal organics such as polyelectrolytes and ammonium alginate, sodium alginate and similar salts, some of which may be classed as (2) fugitive reactants as ammonium alginate, which completely decomposes.

The above listed compounds serve as illustrations to show the type of reaction required. All will yield cations in aqueous systems that gelate the zirconium or hafnium acetate, formate, citrates, propionate. Also suitable, are gelling agents that form the above listed salts as reaction products such as $CaC_2$ which in the presence of water forms $C_2H_2$ gas which leaves the field of action but $Ca^{++}$ ions are formed and the ultimate product on heating is $CaO$.

In like manner, the hardening can be achieved by development of the acetate, formate, etc. by the addition of the acid or salt of the acid to such zirconium or hafnium compounds so as to form the zirconium or hafnium acetate, formate, etc. in situ. It is also beneficial in some instances to add the zirconium or hafnium acetate, formate, etc. as the predried salt so that only water need be added to the dry concrete mixture.

The action of the gelling agents was checked by testing with one or two grams of refractory zirconia particles containing about 5% by weight thereof of zirconium acetate and about ⅓% by weight of the gelling agent such as MgO, which is by far the preferred gelling agent. Results of the gelation tests were as follows, each of the compositions being mixed and allowed to set for 24 hours and then its state of gelation observed:

(1) Gelled:

MgZrO₃ — Li₂ZrSiO₅
CaO — P₂O₅
MgO — K₂CO₃
Li₂SiO₃ — La₂O₃
Na₂CO₃ — KIO₃
CaC₂ — Na₂B₄O₇
Na₄P₂O₇ — ZnO
Na₂SiO₃ — Mg₃(PO₄)₂
Li₂CO₃ — LiOH
Na₂SiF₆ — Sr(CO₃)
MoO₃ — Ba(CO₃)
MgO·3SiO₂

CaZrO₃ — MgO·Al₂O₃
Y₂O₃ (raw) — MgClO₄
ThO₂ (raw) — Li₂ZrO₃[1]
SrCO₃ — Na Benzoate
CaCO₃ — KI
CaMg(CO₃)₂

Raw Y₂O₃ gelates completely in 16–24 hours.
[1] Will gel in about 24 hours at proper ratios.

(2) Not gelled—inadequate at established 24 hour set— ⅓%:

TiO₂ — PbO
CaF₂[2] — Zn acetate
Clay (Bentonite) — Pb(NO₃)₂
NH₄ Formate — Zn Stearate[2]
NiO — Ta₂O₅
K Ferrocynamide — NiCl₂[3]
V₂O₅ — Ce Oxalate[2]
CaCl₂[3] — Na Formate
CaSO₄[2] — NaNO₂
Ca₃(PO₄)₂ — NaNO₃[3]
Cr₂O₃ — Vacetate
CoO₃ — Al₂(SO₄)₃[3]
Ca Formate — Al(OH)₃
Bi(NO₃)₃ — Sb₂O₃
Cr(NO₃)₃ — Na citrate
Na Acetate — NH₄ Bifluoride
K₂SO₄ — Ni Formate
(NH₄)₂S₂O₈ — NH₄CL
Fe₂O₃ — MgF₂[2]
MnO₂

[2] Insolubles so that cation released too slowly.
[3] Anion highly ionizable to inhibit mono acetate formation.

While not wishing to be held to one certain theory the following may offer an empirical explanation of the gelation action:

(1) The cation seems to be the predominant factor in gelation. Most cases of gelation resulted when the cation was one that was high in the electromotive series with some solubility in the acid environment of the acetate solution.

(2) The anion also has an effect on gelation. When it is low in the electromotive series (low oxidation potential i.e. Cl₂, Br₂, F₂, etc.) it inhibits gelation. When a "gelling" cation salt of a strong acid is used it loses or has no "gelling action."

A good definition of a gelling compound seems to be one which is a salt of a gelling cation and weak acid, which gives a very slow pH change towards the alkaline.

The best assumption, which is substantiated in part by Blumenthal, is that the gelling cation "robs" one of the acetate racials from the diacetozirconic acid (zirconium acetate) and replaces it with an (OH⁻) to form an insoluble basic zirconyl mono acetate according to:

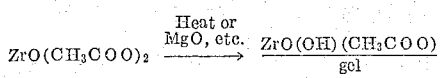

A hypothetical series of equations for what happens in the gelling process might be expressed as follows:

$$MgO + H_2O \longrightarrow Mg(OH)_2$$

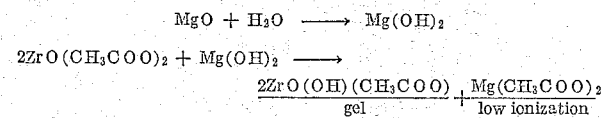

This reaction produces a very slight pH change, but if the pH becomes too alkaline the following may be expected to happen, with a weak bond resulting.

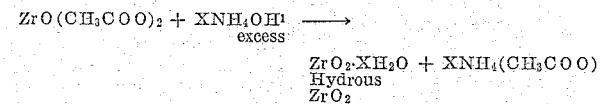

[1] Used NH₄OH because of the relative insolubility of MgO it might take a long time if ever to convert the zirconium acetate completely to the hydrous ZrO₂.

Apparently in the novel self settable composition of the present invention, the effect of the anion component of the gelling agent is slow or no gelation occurs when it forms a strongly dissociable acid as the chlorides and sulphates. It is slow even though the acid formed would have a high ionization constant but the salt is insoluble (or relatively insoluble) as CaF₂.

Gelation proceeds to completion at a rate controlled (1) by the speed the alkalynizing cations enter the field, (2) the degree of solubility of the acetate that might form in the reaction (the less soluble, the slower the set), and (3) the ionization constant of the salt that might form in the reaction. Examples:

(1) NaOH and LiOH gelate faster than Mg(OH)₂ due to their higher solubilities and ionization constants.

(2) A calcium salt that does not contribute adverse anions would set slower than a Li salt. Calcium acetate=37 g./100 cc. water solution; LiAc=300 g./100 cc. water solution CaCO₃=Ca(OH)₂+↑CO₂) no adverse anion = Ca⁺⁺+(OH)⁻ CaCl₂ = Ca(OH)₂+Cl⁻ = Ca⁺⁺ +(OH⁻ (adverse ion)

(3) P₂O₅+Zr⁴⁺→Zr₃(PO₄)₄↓ insoluble

Stability of the acetate that might form is a factor. If aluminum acetate forms and decomposes slightly as temperature increases (slightly) the acetate ions from the salt would increase the concentration of the acetate to inhibit formation of the zirconium acetate.

Pot life (working life) is readily controlled by choice of the sizing for the gelation agent and/or its solubility. A mixture may spread gelation but this is not generally desirable as set structure may be disrupted. Also a highly soluble gelation agent may have its solubility controlled by encapsulation as by gelation which dissolves slowly or by coating with a permeable, though insoluble, film as one of the cellulosic types.

In any event, although generally as low as 0.01% by weight up to as high as 5% by weight of the gelling agent, based on the weight of the refractory particles can be used, the best results are usually obtained by employing about 0.2 to 0.5% by weight of the gelating agent in the formulations. Although generally not commercially employed, an acetate, formate etc. of the group IVB elements such as zirconium acetate may be used in some applications to set a mixture of gelating agents such as a mixture of various mesh sizes of magnesium oxide. One preferred example of this type of composition that sets to firm shape in 5 to 15 minutes is one comprising about 70 parts by weight of 4 mesh MgO, 30 parts of less than 325 mesh MgO, 4 parts of zirconium acetate (dry basis) and 5 parts of water.

Suitable refractory materials include refractory oxides of Groups IIA, IIIA, IIIB, IVA, and the lanthanide elements such as cerium and lanthanum, the actinides as thorium and other refractory materials such as zircon and mullite, besides the illustrated IVB group.

A very effective and non-contaminating cement material can be made according to the present invention in which the composition comprises about 100 parts by weight of an oxide of a Group IVB element such as titanium, zirconium, hafnium and thorium and as a binder therefor a salt of said Group IVB element and an organic acid that acts as a low temperature binder for the green material and converts to the oxide of said element when fired.

The preferred element is zirconium and the preferred binder for the zirconia particles is zirconium acetate. The bonding action of the zirconium acetate is provided by its gelation from aqueous solution as the zirconia-zirconium acetate mixture is dried, the salt converting to a gel-like polymer or coating upon further heating and finally recrystallizing to zirconium oxide upon still further heating.

Although zirconium acetate is the preferred binder for zirconia particles and hafnium acetate also is a preferred binder particularly when used for hafnia particles, other salts of the Group IVB element having an atomic weight of about 48 to 179 and an organic acid such as citric, tartaric, formic and propionic may be used to obtain at least some of the benefits of the present invention. An acid such as acetic acid and formic acid is highly preferred for the best low and intermediate temperature binding action and for burning cleanly away at high temperatures where the salt forms the recrystallized oxide such as zirconia or hafnia which becomes the high temperature binder.

Thus, for the best results, the organic acid used should be acetic acid or other acid having a monovalent radical for polymerization in the above described manner. Fatty acid salts such as zirconium stearate are insoluble in the aqueous environs and do not polymerize. Thus, Group IVB element salts of an organic acid in which the acid consists only of carbon, hydrogen and oxygen atoms and about two to eight carbon atoms are preferred.

In any event, the low, intermediate, and high temperature binder material should be used in amounts of about ¼ to 50 parts by weight and preferably 4 to 5 up to 15 parts by weight per 100 parts by weight of the refractory particles. Although the number of parts by weight may not be critical in the sense of a very sharp drop-off in properties, increased amounts of the minimum amount of 50 parts by weight or even above the preferred upper limit of about 15 to 20 parts by weight, sometimes serve to unduly increase the fluidity of the concrete or mortar and unduly extend the setting time.

As indicated by the examples that follow, the binder (which is preferably zirconium acetate) is used in the form of an aqueous solution thereof in which the $ZrO_2$ content is preferably about 10 to 30 percent by weight. The salt itself can be generally about 10 to 70 percent by weight of the solution for satisfactory binding and burn-out properties.

The following examples are intended to illustrate the invention and not to limit it in any way.

Example 1

A cement composition was prepared according to the following formula.

| Ingredients: | Parts by weight |
| --- | --- |
| Zirconia, −14 +28 mesh | 10 |
| Zirconia, − 2+ 48 mesh | 20 |
| Zirconia, −48 +100 mesh | 30 |
| Zirconia, −100 mesh | 20 |
| Zirconia, −325 mesh | 20 |
| Mgo powder, 325 mesh | 0.5 |
| Zirconia acetate solution, 20% $ZrO_2$ | 1.2 |

The powdered and granular zirconia and magnesia particles were thoroughly blended and 9 cc. of a 20% $ZrO_2$ zirconium acetate solution (specific gravity of 1.3) was added to 100 grams of the above zirconia and magnesia particle blend. The resultant mixture was blended well and then poured into a series of molds with vibration. After the green mixture was allowed to stand undisturbed for two hours, the mold was removed and the shape dried at 250° F. The resultant molded articles were incorporated into a device requiring heat resistance and found to be satisfactory. One article, prepared in accordance with the present invention, was used with zirconia refractory bricks to form a furnace wall for use with molten chromium. The molded article gave good service and did not introduce undesirable radicals such as sulfate into the molten metal.

Another molded article was prepared as described above and the dried article fired just at 1800° F. before incorporating the same into a heat resisting furnace part. The resultant molded article provided good heat resistance service.

Example 2

A molded refractory composition was prepared for use in a heat resisting device according to the method de-described in Example 1, the formula being as follows.

| Ingredients: | Parts by weight |
| --- | --- |
| Zirconium silicate, −28 +48 mesh | 8 |
| Zirconium silicate, −48 +100 mesh | 24 |
| Zirconium silicate, −100 mesh | 38 |
| Zirconium silicate, −325 mesh | 30 |
| Mgo powder, −325 mesh | ⅓ |
| Zirconia acetate solution, 20% $ZrO_2$ | 0.7 |

The above fine grained mixture was tamped into a mold, allowed to set for 1½ hours, and then, the mold was removed and the article dried at 200° F. for 8 hours.

The green mixture of Example 1 was given a longer set-time than the mixture of Example 2. The mixture of Example 2 needed less time to set because of its finer MgO curative particles. In general, the finer the curative particles, the faster the gelation of the zirconium acetate binder.

Example 3

A dry castable self-setting composition was prepared according to the following formula.

| Ingredients: | Parts by weight |
| --- | --- |
| Zirconia, −28 +48 mesh | 30 |
| Zirconia, −48 +100 mesh | 30 |
| Zirconia, −100 mesh | 20 |
| Zirconia, fine grain 85% minus 5 microns | 20 |
| MgO, fused, −325 mesh | 0.25 |
| Zirconium acetate, dry powder | 4 |
| Water | 8 |

The dry zirconium acetate was prepared by evaporating a 22% $ZrO_2$ content aqueous solution of zirconium acetate at 300° F. Four parts of the dry zirconium acetate is approximately equivalent to about 8 cc. of the 22% $ZrO_2$ content zirconium acetate solution. The dried zirconium acetate was mixed with a sized zirconia and water and thereafter cast and dried. The cast piece became firm in 20 minutes and hard in 2 hours.

In preparing the self-setting cement from the above formula, the 4 parts of dry zirconium acetate, the 20 parts of zirconia (35% less than 5 microns) and the 0.25 part of powdered MgO were dry ball milled together for 2 hours and thereafter mixed with the grog and the 8 parts of water.

The resultant mixture was shaped by troweling into a heat resisting furnace part, by treating the same as a mortar between two zirconia bricks. There was no noticeable reduction of the green strength between pieces cast by the above dry castable formulation and the two component castable formulation of Example 1. The resultant troweled article was strong, hard and heat resistant.

In the above example of a dry castable self-setting composition, other sizing materials including coarse aggregate and very fine powders can be used to provide nearly equivalent results. Such suitable sizing materials are 4 mesh zirconia, 1″ diameter zirconia aggregate and powdered zirconia having a particle size of 44 microns or smaller. Such sizing can be used advantageously to produce zirconia or other refractory spaghetti as a continuous filament of rod or in a random mass as in steel wool. Also, the sizing can be used in combination with reinforcement by ceramic, metal and metal-ceramic rods, bars, mesh or fiber.

While outstanding results are obtained with zirconium acetate as the binding material, other zirconium salts of organic acids such as formic acid, citric acid, lactic acid and glycolic acid can be used in place of all or part of the zirconium acetate used in the examples to provide nearly equivalent results. While good results are obtained by the use of zirconium formate, it is preferred that only about 50% by weight of the zirconium acetate used be substituted for by other zirconium salts of an organic acid except for the previously mentioned zirconium formate which can be used as all or any part of the preferred binder material.

In a similar manner, the zirconia used can be substituted for in whole or part by hafnia to provide nearly equivalent results. For the best high purity bonded articles using hafnia as the refractory oxide, hafnium acetate should be used as the bonding material, although other hafnium salts of organic acids namely, hafnium formate, hafnium citrate and hafnium tartrate can be used to obtain some benefits of the present invention.

Good high purity bonded articles can be obtained in some applications using the methods described in Examples 1–3 employing other refractory oxides of Groups IIA, IIIA and IIIB, Groups IVA and IVB and lanthanide oxide elements such as lanthanum, cerium and the actinide, thorium.

In some applications where the presence of zirconia is of no concern, mullite, an aluminum silicate having about 70% by weight alumina can be used as part or all of the zirconium refractory material of Example 1 or the zirconium silicate of Example 2.

The MgO powder of Examples 1 and 2 can be substituted for in whole or part by other gelling agents such as $CaCO_3$, $ZnO$, $Na_2CO_3$, $Y_2O_3$, $Dy_2O_3$—previously described as suitable—to provide somewhat equivalent results.

As previously indicated, other gelling agents can be substituted for the MgO to provide nearly equivalent results—the molded materials being self-setting without the need of heat and yet, are strong, hard and corrosion resistant. The salts that satisfactorily gelate the zirconium or hafnium acetate (or formate, lactate) and can be substituted for the MgO to provide substantially equivalent results are salts that form stabilizing oxides such as (1) the alkaline earth oxides including CaO, MgO, BaO, SrO, alkali metal oxides including lithium oxide, (2) salts that gelate the binder and form fugitive reaction products including $MoO_3$, $Na_2CO_3$, ZnO, $WO_3$, $Na_2B_4O_7$, $KIO_3$, $P_2O_5$ and, (3) salts that in low concentration, preferably 0.01 to 2 percent by weight of the refractory particles, are not deleterious such as sodium salts ($Na_2SiO_3$, $Na_2ZrO_3$, $Na_4P_2O_7$, etc.), lithium salts ($Li_2SiO_3$, $Li_2ZrO_3$, $Li_2ZrSiO_5$, etc.), potassium salts ($K_2SiO_3$, $K_2ZrO_3$, $K_4P_2O_7$, etc.), magnesium salts ($MgO \cdot 3SiO$, $MgO \cdot Al_2O_3$), organics and metal-organics as polyelectrolytes and the ammonium and sodium alginates and similar salts.

It is to be understood that in accordance with the provisions of the patent statutes, the particular form of product shown and described and the particular procedure set forth are presented for the purposes of explanation and illustration and that the various modificaions of said product and procedure can be made without departing from the invention.

What is claimed is:

1. A method of making a self-setting cement composition adapted for use as a heat resistant material, said method comprising the steps of (1) mixing about 100 parts by weight of finely divided particles of a refractory material with binder-forming ingredients comprising (a) about ¼ to 50 parts by weight of a salt of an element of the group consisting of zirconium, hafnium, titanium, and thorium and an organic acid that is a low temperature binder for said refractory particles and has 1 to 8 carbon atoms and 1 to 3 carboxyl groups, (b) water, and (c) about 0.01 to 5 parts by weight of a gelling agent that reacts with the salt in the presence of the water to form a fluid mixture, (2) forming the mixture into a desired shape, and (3) reacting (a) and (c) in the presence of the water to change the fluid mixture to a solid hardened article of said desired shape.

2. A method of making a self-setting composition comprising the steps of (1) mixing (a) about 100 parts by weight of particles of a refractory oxide of a Group IVB element with (b) about ¼ to 50 parts by weight of a salt of an element of the group consisting of zirconium, hafnium, titanium and thorium and an organic acid having 1 to 8 carbon atoms and 1 to 3 carboxyl groups, (c) water, and (d) about 0.01 to 5 parts by weight of a gelling agent having a cation for reaction with the salt, to form a fluid mixture, (2) forming the fluid mixture into a desired shape and (3) reacting said salt and said gelling agent to harden the mixture and thus provide a self-setting composition.

3. A method of making a self-setting refractory composition comprising (1) mixing about 100 parts by weight of about 2 mesh to ½ micron particles of zirconia and about ¼ to 50 parts by weight of zirconium acetate and about 0.01 to 5 parts by weight of magnesium oxide and water to form a fluid composition, (2) forming the fluid composition to a desired shape, and (3) permitting the fluid mixture to self-harden undisturbed for a predetermined period during which time the zirconium acetate gelates to provide a self-set refractory composition.

4. A method of making a self-setting refractory composition comprising (1) mixing about 100 parts by weight of about 2 mesh to ½ micron particles of hafnia and about ¼ to 50 parts by weight of hafnium acetate and about 0.01 to 5 parts by weight of magnesium oxide in an aqueous system to form a fluid mixture, (2) forming the fluid mixture to a desired shape, and (3) permitting the fluid mixture to self-harden undisturbed for a predetermined period during which time said hafnia acetate and magnesium oxide react.

5. A method of making a self-setting refractory composition comprising (1) mixing (a) about 100 parts by weight of about 2 mesh to ½ micron particles of zirconium silicate and binder-forming ingredients comprising (b) about ¼ to 50 parts by weight of zirconium acetate and (c) about 0.01 to 5 parts by weight magnesium oxide and (d) water to form a fluid mixture, (2) forming the mixture into a desired shape, and (3) reacting (b) and (c) in the presence of water to change the fluid mixture into a hardened refractory article of said desired shape.

6. A method of making a self-setting refractory article, said method comprising the steps of (1) mixing about 100 parts by weight of 2 mesh to ½ micron particles of $Y_2O_3$ stabilized zirconia material with binder-forming ingredients consisting essentially of (a) about ¼ to 50 parts by weight of an aqueous solution of a salt of a Group IVB element and an organic acid having 1 to 8 carbon atoms and 1 to 3 carboxyl groups that is a low temperature binder for said refractory and (b) about 0.01 to 15 parts by weight of a gelling agent for said salt to form a fluid mixture (2) forming the fluid mixture in a desired shape, and (3) reacting said gelling agent and said salt in the presence of water to convert the fluid mixture into a solid article.

7. A composition adapted for self-setting cement or mortar applications without the use of external heat to set the same, said composition consisting essentially of an intimate admixture of (1) about 100 parts by weight of refractory particles, (2) water, and (3) binder-forming ingredients for the refractory particles comprising (a) a salt of an element of the goup consisting of zirconium, titanium, hafnium and thorium and an organic acid having 1 to 8 carbon atoms and 1 to 3 carboxyl groups, and (b) about 0.01 to 5 parts by weight of a gelling agent having a cation that reacts with the salt in the presence of water, the agent also having an anion that is a weak acid.

8. A composition adapted for self-setting cement applications without the use of external heat to set the same, said composition consisting essentially of an intimate admixture of (1) about 100 parts by weight of refractory particles of zirconia, (2) water, and (3) binder-forming ingredients comprising (a) about ¼ to 50 parts by weight of zirconium acetate, and (b) about 0.01 to 5 parts by weight of magnesium oxide for gelling said salt to thus provide a self-setting composition.

9. A refractory article made from a fluid self-setting cement composition, said composition consisting essentially of a mixture of (1) about 100 parts by weight of particles of a refractory oxide of a Group IVB element, (2) water, and (3) binder-forming ingredients comprising (a) about ¼ to 50 parts by weight of a salt of a Group IVB element and an organic acid having 1 to 8 carbon atoms and 1 to 3 carboxyl groups, and (b) an agent having a gelling cation that reacts with said salt in the presence of water.

10. A refractory article made from a fluid composition that hardens without the need of external heat to form the solid refractory article, said composition consisting essentially of (1) about 100 parts by weight of refractory particles of a Group IVB oxide, (2) water, (3) about ½ to 50 parts by weight of an aqueous solution containing about 10 to 70 percent by weight of a salt of a Group IVB element and an organic acid having about 1 to 8 carbon atoms and 1 to 3 carboxyl groups and (4) and about 0.01 to 15 parts by weight of a gelling agent that reacts with the salt in the presence of water to convert the fluid composition to a hard solid article.

11. A refractory article made from a fluid composition that hardens into a solid refractory article without the use of external heat whereby the fluid composition can be formed in a confined space and hardened there, said fluid composition consisting essentially of (1) about 100 parts by weight of particles of a refractory material (2) about ½ to 50 parts by weight of zirconium acetate and water in which the zirconium acetate is about 10 to 70 percent by weight of the total weight of said acetate and water, and (3) about 0.1 to 15 parts by weight of magnesium oxide for reaction with the zirconium acetate.

12. A refractory article made from a fluid composition that hardens into a solid refractory article without the use of external heat whereby the fluid composition can be formed in a confined space and hardened there, said fluid composition consisting essentially of (1) about 100 parts by weight of particles of a refractory material (2) about ½ to 50 parts by weight of hafnium acetate and water in which the hafnium acetate is about 10 to 70 percent by weight of the total weight of said acetate and water and (3) about 0.1 to 15 parts by weight of magnesium oxide for reaction with the hafnium acetate.

13. A refractory article made from a fluid composition that hardens without the use of external heat to form the solid refractory article, said composition consisting essentially of (1) about 100 parts by weight of refractory particles of a Group IVB oxide, (2) about ½ to 50 parts by weight of an aqueous solution containing about 10 to 70 percent by weight of a salt of an element of the group consisting of zirconium, titanium, hafnium and thorium and an organic acid having about 1 to 8 carbon atoms and 1 to 3 carboxyl groups, and (3) about 0.01 to 15 parts by weight of a gelling agent that reacts with the salt to convert the fluid composition into a solid article, said gelling agent being selected from a member of the group consisting of an alkaline earth oxide, a rare earth oxide, a salt of an alkali metal and a weak acid, a salt of an alkaline earth metal and a weak acid, and an ammonium salt of a weak acid.

14. A refractory article made from a fluid composition that hardens into a solid refractory article without the need of external heat whereby the fluid composition can be formed in a confined space and hardened there, said fluid composition consisting essentially of (1) about 100 parts by weight of particles of a refractory material, (2) about ½ to 50 parts by weight of zirconium acetate and water in which the zirconium acetate is about 10 to 70 percent by weight of the total weight of acetate and water and (3) about 0.1 to 15 parts by weight of magnesium carbonate for reaction with the zirconium acetate.

15. A refractory article made from a fluid composition that hardens into a solid refractory article without the use of external heat whereby the fluid composition can be formed in a confined space and hardened there, said fluid composition consisting essentially of (1) about 100 parts by weight of particles of a refractory Group IVB oxide (2) about ½ to 50 parts by weight of zirconium acetate and water in which the zirconium acetate is about 10 to 70 percent by weight of the total weight of acetate and water and (3) about 0.1 to 15 parts by weight of calcium carbonate for reaction with the zirconium acetate, said article having pores therein created by $CO_2$ evolution.

16. A refractory article made from a fluid composition that can be self-set at ambient temperature without the use of external heat, the composition consisting essentially of a mixture of (1) about 70 parts by weight of 4 mesh MgO, (2) about 30 parts by weight of less than 325 mesh MgO and (3) about 4 parts by weight of zirconium acetate and about 5 parts by weight of water.

17. A refractory article made from a fluid composition that self-hardens undisturbed to form the solid refractory article, said composition consisting essentially of (1) about 100 parts by weight of refractory particles (2) about ½ to 50 parts by weight of an aqueous solution containing about 10 to 70 percent by weight of a salt of an element selected from the group consisting of zirconium, titanium, hafnium and thorium and an organic acid having about 1 to 8 carbon atoms and 1 to 3 carboxyl groups and (3) and about 0.01 to 15 parts by weight of a gelling agent that reacts with the salt in the presence of water to convert the fluid composition to a hard solid article, said gelling agent having a gelling cation that reacts with said salt and said agent having an anion that is a weak acid.

18. An article as defined in claim 17 and in which the salt is zirconium acetate and the gelling agent is magnesium oxide.

References Cited by the Examiner

UNITED STATES PATENTS 1,694,924   12/28   Lowe _____ 106—57

TOBIAS E. LEVOW, *Primary Examiner*.